US012801500B2

(12) United States Patent
Yadav et al.

(10) Patent No.: US 12,801,500 B2
(45) Date of Patent: Nov. 17, 2026

(54) INTELLIGENT ENABLE AND DISABLE OF SCRIPTS WHILE LEVERAGING HOST DISCOVERY OF DATA PROTECTION SOLUTIONS

(71) Applicant: Dell Products L.P., Round Rock, TX (US)

(72) Inventors: Sunil Yadav, Bengalure (IN); Shelesh Chopra, Bangalore (IN); Madhukar Prashant Shukla, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/736,296

(22) Filed: Jun. 6, 2024

(65) Prior Publication Data

US 2025/0377981 A1 Dec. 11, 2025

(51) Int. Cl.
*G06F 11/1446* (2026.01)

(52) U.S. Cl.
CPC ...... *G06F 11/1458* (2013.01); *G06F 2201/84* (2013.01)

(58) Field of Classification Search
CPC ...... G06F 16/23; G06F 16/33; G06F 11/1458; G06F 2201/84
USPC .......................................................... 707/654
See application file for complete search history.

(56) References Cited

U.S. PATENT DOCUMENTS 6,904,424 B1 * 6/2005 Gusler ................ G06F 11/3476
10,956,477 B1 * 3/2021 Fang ....................... G06F 40/30
11,150,957 B1 * 10/2021 Ferreira ................ G06F 3/0484
11,341,234 B1 * 5/2022 Voss .................... G06F 11/1451
11,379,146 B1 * 7/2022 Buchman ................ G06F 3/065
11,403,184 B1 * 8/2022 Kumar .................. G06F 11/076
12,184,657 B1 * 12/2024 Yembari .................. G06N 3/02
2007/0168956 A1 * 7/2007 Moore ...................... G06F 8/60 717/120
2008/0250083 A1 * 10/2008 Kovacs ............... G06F 11/1461
2013/0263113 A1 * 10/2013 Cavazza ................... G06F 8/60 717/177
2014/0157037 A1 * 6/2014 Bennah ............... G06F 11/0793 714/37
2019/0155591 A1 * 5/2019 Kumar .................... G06F 11/34
2020/0097178 A1 * 3/2020 Bhanushali ............. G06F 3/065
2020/0233750 A1 * 7/2020 Ashokkumar ...... G06F 11/1451
2020/0366706 A1 * 11/2020 Sexton ................ H04L 63/1425
2023/0083504 A1 * 3/2023 Burns ................... B60R 25/305 705/4

(Continued)

*Primary Examiner* — Amy Ng
*Assistant Examiner* — Abdullah A Daud
(74) *Attorney, Agent, or Firm* — Chamberlain, Hrdlicka, White, Williams & Aughtry; Aly Z. Dossa

(57) ABSTRACT

A method for managing data protection scripts includes obtaining, by a backup server, registration information associated with a set of applications operating on a production environment, performing application discovery on the production environment using the registration information to obtain application information, after performing the application discovery, obtaining a request for executing a data protection script by an application of the set of applications, applying a portion of the application information corresponding to the application to a script processing engine to obtain a script recommendation, and implementing the script recommendation on the production environment.

12 Claims, 5 Drawing Sheets

(56) References Cited

U.S. PATENT DOCUMENTS

| | | | | |
|---|---|---|---|---|
| 2023/0275917 | A1 * | 8/2023 | Karmali | G06F 16/9537<br>709/224 |
| 2023/0388307 | A1 * | 11/2023 | Olson | H04L 63/101 |
| 2023/0410104 | A1 * | 12/2023 | Towles | G06F 16/435 |
| 2025/0004786 | A1 * | 1/2025 | Cooper | G06F 9/4411 |
| 2025/0036758 | A1 * | 1/2025 | Seck | G06F 21/554 |

* cited by examiner

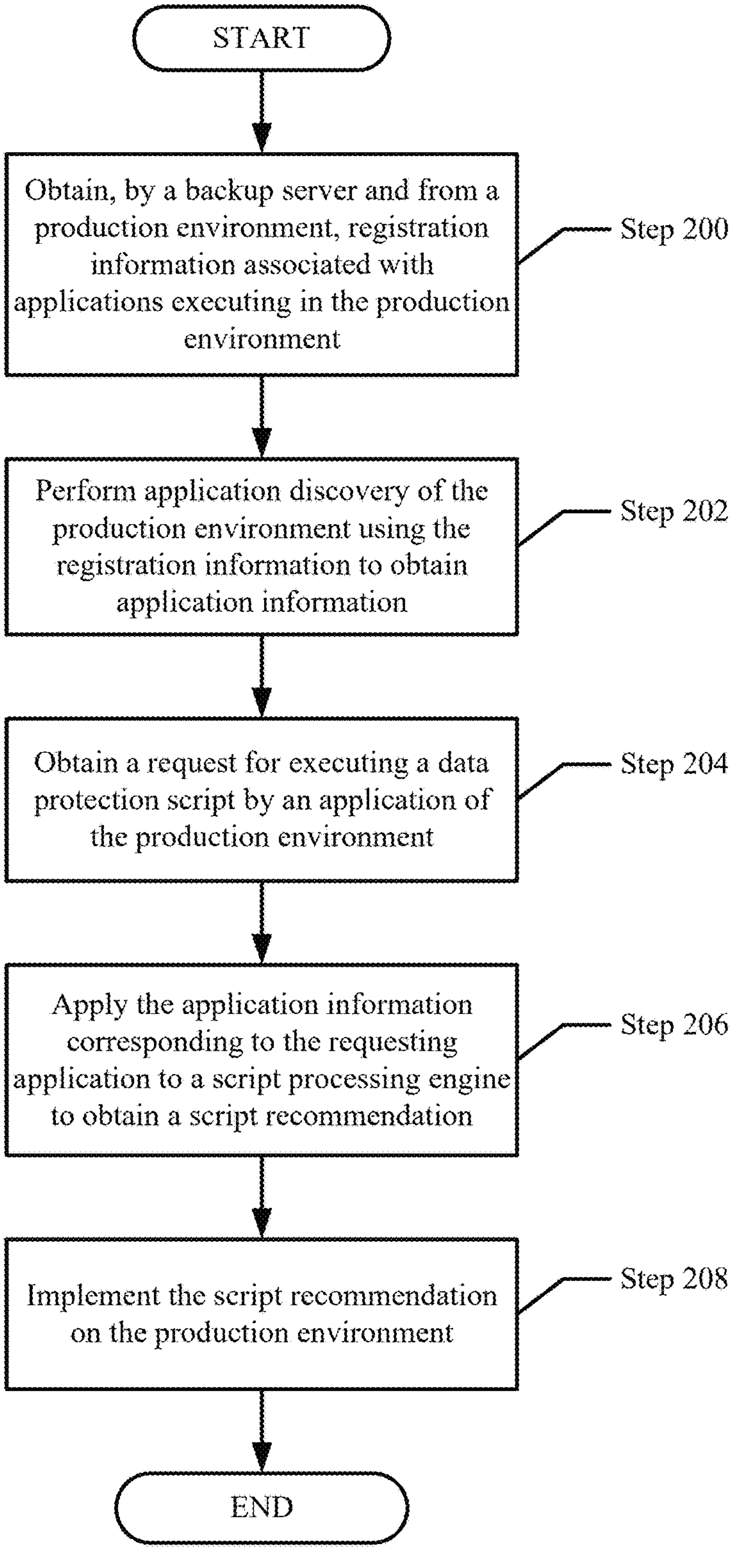
FIG. 2.1

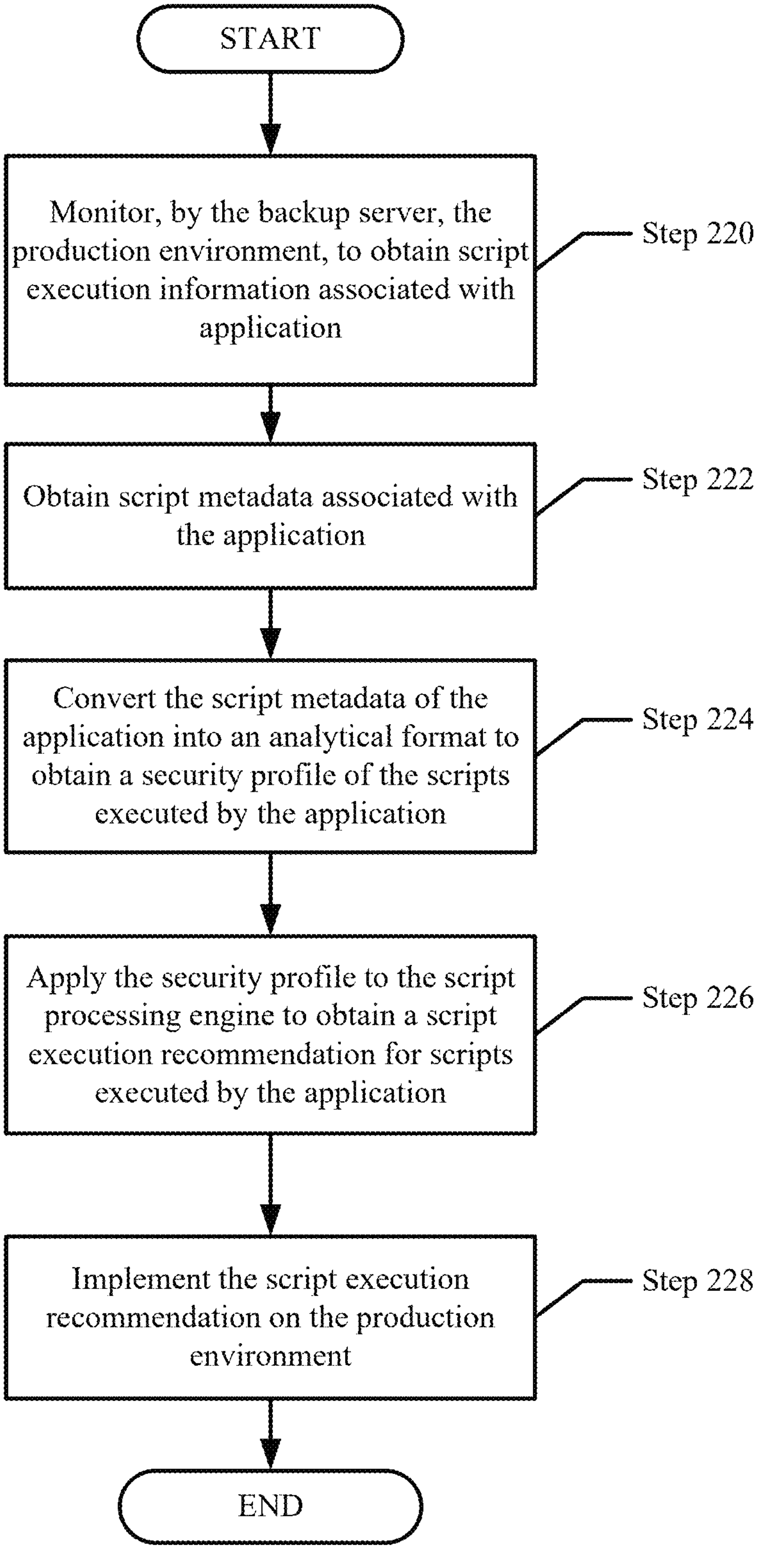
FIG. 2.2

INTELLIGENT ENABLE AND DISABLE OF SCRIPTS WHILE LEVERAGING HOST DISCOVERY OF DATA PROTECTION SOLUTIONS

BACKGROUND

In a data protection environment in which production environments host applications whose data is protected using a backup storage system, users of the applications may initiate data protection scripts either before or after backups of the applications. The execution of the data protection scripts may impact the overall data protection environment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method of managing script execution in accordance with one or more embodiments of the invention.

FIG. 2.2 shows a flowchart of a method of managing applications executing data protection scripts in accordance with one or more embodiments of the invention.

DETAILED DESCRIPTION

Figure 1:
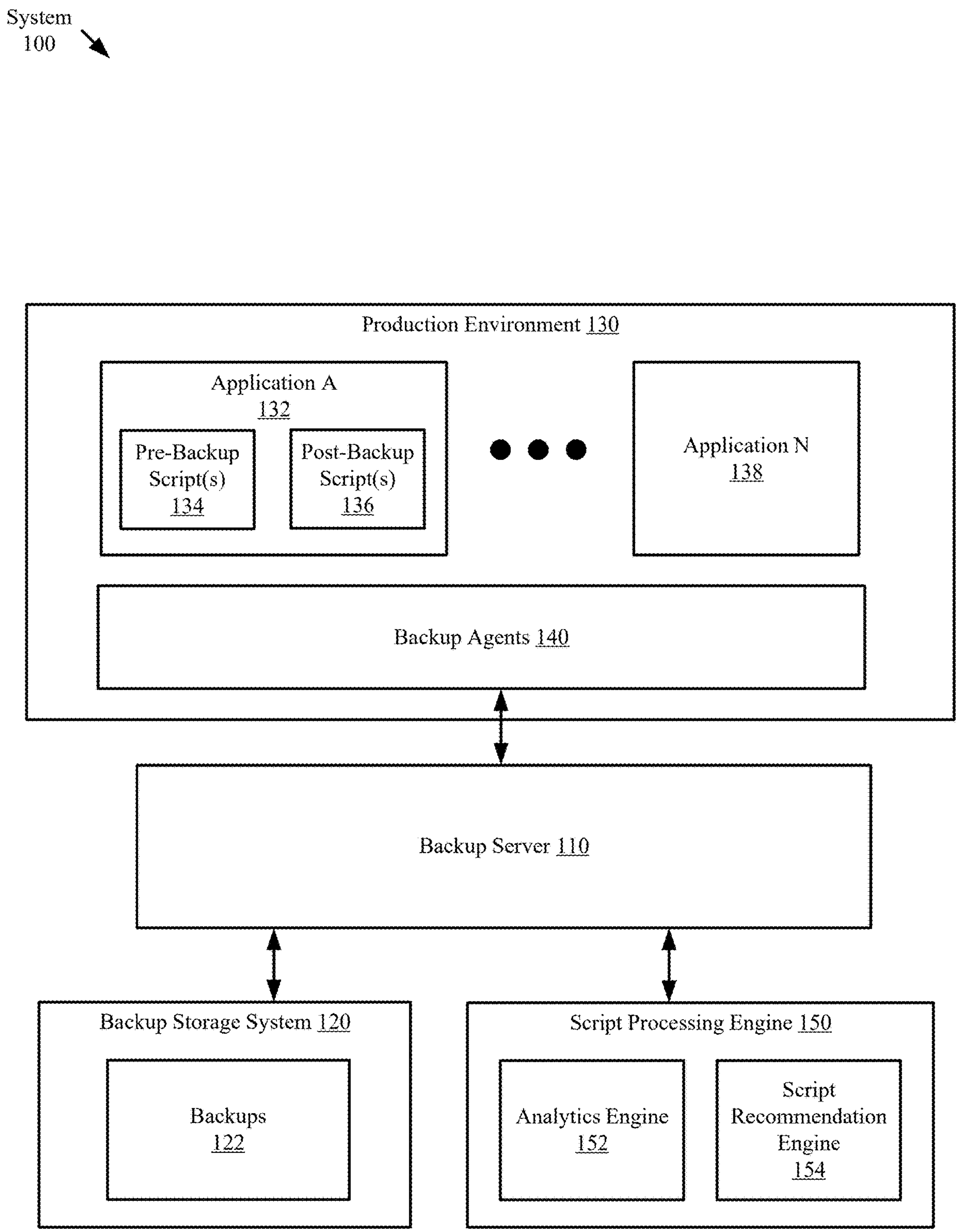
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Embodiments disclosed herein include systems and methods for managing script usage initiated by a production environment and based on data protection workloads (e.g., backups or restorations). Embodiments of the invention include utilizing a script processing engine that obtains environment information about a production environments, including the applications executing in the production environment, the users operating on the applications, and other information about the production environment, and using the obtained environment information to generate recommendations for implementing script enabling and/or disabling on a per-application basis. The recommendation may be executed by the script processing engine, or by another entity, following any further approval of the recommendation by an authoritative entity of the system.

Embodiments of the invention further include monitoring the execution of the scripts associated with data protection workloads (e.g., backups or recovery of application data) to obtain additional telemetry data. The telemetry data may be used to generate an analytical formatted document that is applied to an analytical component of the script processing engine to obtain script execution recommendations. The script execution recommendations may be implemented on a per-script basis (e.g., based on information such as a user generating the script, whether the script was altered, etc.).

In one or more embodiments, a proposed solution is to extend functionality of advance script management feature in a backup server to achieve security of an organization. The advance script management feature has the capability to capture and store information about the scripts associated with each of the applications executing on the production environment. The backup server may store such information as script metadata. The backup server may include capabilities to restrict access to those uploaded scripts; a backup admin may view all the scripts and manage said scripts.

Application system discovery feature of the backup server has capability to capture and store details about the production environment executing the applications. The application system discovery captures, for example: name of the system, which applications are running (e.g., Oracle databases, Microsoft SQL databases, Microsoft Exchange databases or other databases), vendor(s) of the application (e.g., Oracle, Microsoft, SAP or VMAX), the version of the application, information of the user, natural identifiers of the system, application cluster details such as a type of cluster, node selection, in which node of cluster system application is running, network address information of the clustered system as well as individual node information.

One or more embodiments leverage the application system and application discovery of the backup server, which captures the information about the application system and applications as part of discovery. The backup server may generate a document in a specific format. The document may be given as an input to a script processing engine to provide recommendations to the backup server to manage script enablement and disablement. If it recommends enabling, Prescript and Postscript will be enabled on system else it will go for approval from the authorities, once get approved, it enables the script on the system otherwise it will be disabled on the systems.

The following describes various embodiments of the invention.

FIG. 1 shows a system in accordance with one or more embodiments of the invention. The system (100) includes a production environment (130) executing any number of applications (132, 138), a backup server (110), a backup storage system (120), and a script processing engine (150). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the production environment (130) provides computing resources to one or more applications (132, 138). The applications (132, 138) provide services to users by data. The applications (132, 138) may be instances of databases, virtual machines, email service providers, and/or other services.

In one or more embodiments, the applications (132, 138) of the production environment (130) may generate, store, and/or otherwise process data. The data processed by the applications (referred to as application data) may be backed up to a backup storage system (120) as backups (122) each corresponding to application data of an application (132, 138) at a given point in time. The production environment (130) may provide backup agents (140) that copy the application data to the backup storage system (120) to be stored as backups (122).

In one or more embodiments, the applications (132, 138)) initiate data protection scripts. In one or more embodiments, data protection scripts refers to executable files that specify one or more actions to be executed on the application data, on a backup (122), or on the production environment (130) in relation to the generation or recovery of a backup (122). The data protection scripts may be pre-backup scripts (134), post-backup scripts (136), pre-recovery scripts (not shown), or post-recovery scripts (not shown). Other data protection scripts may be initiated by the applications (132, 138) without departing from the invention. The pre-backup scripts (134) may be scripts designed to be executed before a backup is performed. Actions that may be performed in pre-backup or post-backup scripts (134, 136) include, but are not limited to, deleting files of application data prior to backup, suspending virtual machine operation before a backup or recovery, re-activating virtual machine operation after a backup or recovery, generating a virtual machine snapshot, mounting or unmounting a file system of the application data, pausing operation of a database, obtaining transaction logs of the application data, generating a log entry of a backup or recovery, and obtaining specified metadata of the application data.

Figure 4:
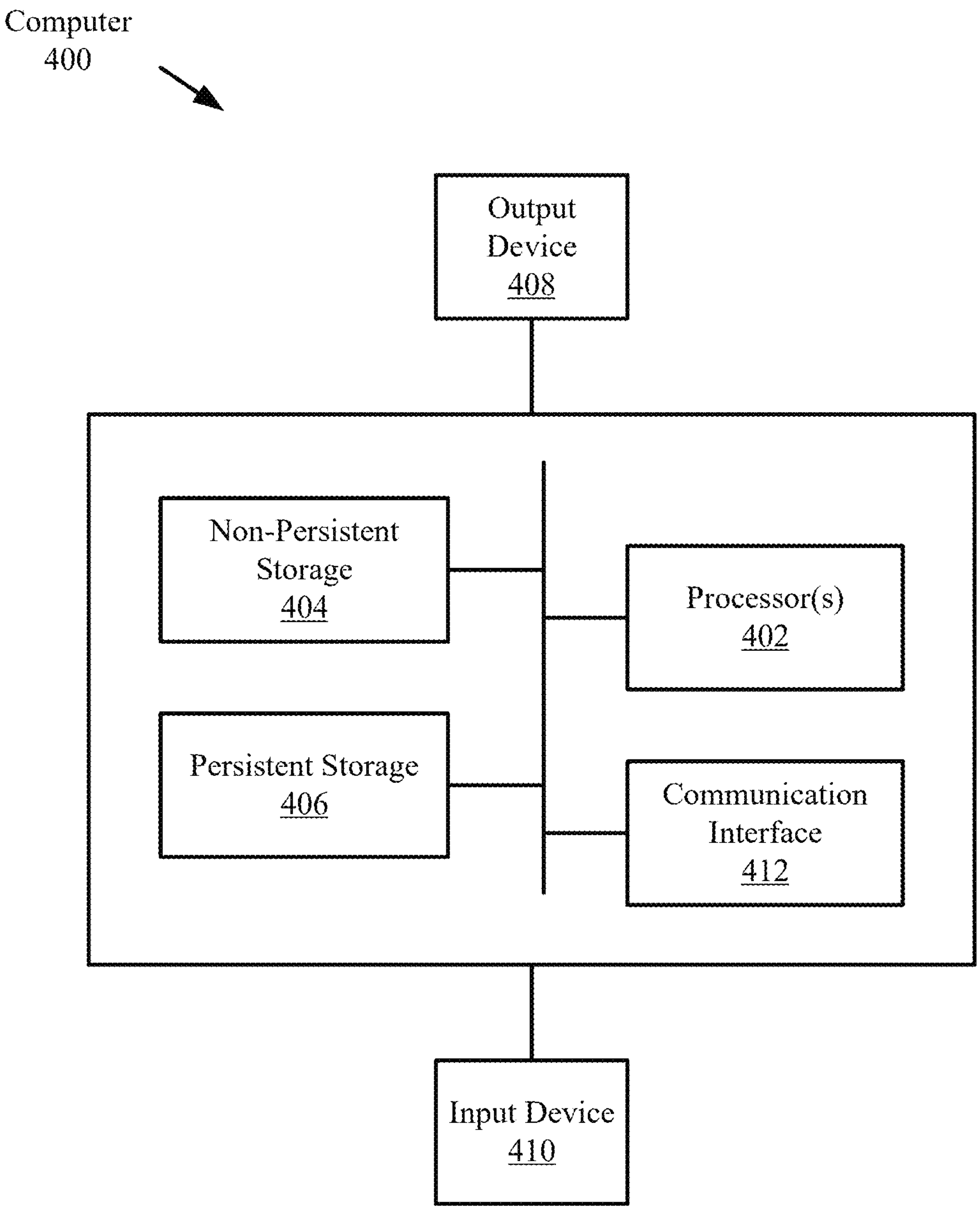
FIG. 4 shows a diagram of a computing device in accordance with one or more embodiments of the invention.

In one or more embodiments, the production environment (130), and/or any components illustrated within, is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the production environment (130) (and/or any components illustrated within) described throughout this present disclosure.

Alternatively, in one or more embodiments of the invention, the production environment (130) is implemented as a logical device. A logical device may utilize the computing resources of any number of computing devices to provide the functionality of the production environment (130) described throughout this present disclosure.

In one or more embodiments, the data protection workloads such as backups or recovery of the application data may be orchestrated by a backup server (110). The backup server (110) includes functionality for managing backup schedules for generating the backups (122) for the applications (132, 138) in the production environment (130), managing recovery operations, and monitoring other operations of the production environment (130) for the purposes of data protection.

In one or more embodiments, the backup server (110) may include application discovery services. The application discovery services include identifying applications (132, 138) operating in the production environment (130) using a registration operation in which all applications (132, 138) in the production environment (130) register their presence with the backup server (110), storing information associated with the applications such as, for example, the name of the application (or name of a corresponding application system), a type of application (e.g., database, virtual machine, a database management system), a vendor of the application, information about the users using the applications (132, 138), application cluster details, a node selection, a number of nodes executing the applications (132, 138), and network address information of the cluster and/or of each node of the production environment (130). The application discovery performed by the backup server (110) may be performed, for example, in accordance with FIGS. 2.1-2.2.

In one or more embodiments, the production environment (130) further includes functionality for monitoring script execution of the applications (132, 138). The script execution may be monitored in accordance with the methods of FIGS. 2.1-2.2. The monitoring may result in obtaining telemetry data, application information, registration information, and/or other information without departing from the invention. The obtained information may be processed using a script processing engine (150) in accordance with the methods of FIGS. 2.1-2.2.

In one or more embodiments, the script processing engine (150) includes functionality for processing information obtained from the backup server (110) to generate recommendations for enabling or disabling data protection scripts (e.g., 134, 1348) from being executed in the production environment (130) and/or using the backup storage system (120). The script processing engine (150) may utilize an analytics engine (152) that performs machine learning to analyze an obtained application information to generate a script recommendation for allowing or disabling one or more data protection scripts. Each of the data protection scripts may be enabled and/or disabled on a per-application basis. Said another way, the analytics engine (152) may generate script recommendations for whether an application is allowed to execute data protection scripts. Alternatively, the information may be input to a script recommendation engine (154) that processes the application information to provide script recommendations on a per-script basis. In this manner, each data protection script is processed to determine whether the data protection script is to be executed. In one or more embodiments, the processing of the data protection scripts on a per-script basis may be performed, for example, in accordance with FIG. 2.1. In one or more embodiments, the processing of the data protection scripts on a per-application basis is performed, for example, in accordance with FIG. 2.2.

In one or more embodiments, the script processing engine (150) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the script processing engine (150) (and/or any components illustrated within) described throughout this present disclosure.

Alternatively, in one or more embodiments of the invention, the script processing engine (150) is implemented as a logical device. A logical device may utilize the computing resources of any number of computing devices to provide the functionality of the script processing engine (150) described throughout this present disclosure.

While illustrated as a separate component, the script processing engine (150) may be a component of the backup server (110) without departing from the invention.

In one or more embodiments, the backup server (110) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the backup server (110) (and/or any components illustrated within) described throughout this present disclosure.

Alternatively, in one or more embodiments of the invention, the backup server (110) is implemented as a logical device. A logical device may utilize the computing resources of any number of computing devices to provide the functionality of the backup server (110) described throughout this present disclosure.

FIG. 2.1 shows a flowchart of a method of managing script execution in accordance with one or more embodiments of the invention. The method shown in FIG. 2.1 may be performed by, for example, a backup server (e.g., 110, FIG. 1). Other components of the system in FIG. 1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, registration information associated with applications executing in the production environment. In one or more embodiments of the invention, the registration information specifies information about the applications registered with the backup server. The registration information may specify, for example, an application identifier, a date of registration for each application, and information about an owner of each of the applications.

In step 202, application discovery of the production environment is performed using the registration information to obtain application information. The application discover may include obtaining additional information about the applications such as a type of application, a number of users using or operating each of the applications, and a rate that each application is backed up or recovered. The rate of an application being backed up and/or recovered may be referred to as a rate of data protection.

In step 204, a request for executing a data protection script by an application is obtained. The request may specify executing one or more data protection scripts by the application.

In step 206, the application information corresponding to the application is applied to a script processing engine to obtain a script recommendation for executing the data protection script. The script processing engine may obtain the application information of the corresponding application in a format readable to the script processing engine. The formatted application information may be processed using a machine learning algorithm that classifies the application information to output a recommendation about whether the data protection script(s) requested are allowed to be executed. The output may be referred to as a script recommendation.

In step 208, the script recommendation is implemented on the production environment. In one or more embodiments of the invention, the script recommendation is implemented based on whether the script recommendation indicates allowing or disabling execution of the requested data protection script.

For example, if the script recommendation indicates allowing the data protection script to be executed, then the backup server may indicate such recommendation to the application by notifying the application of the script being allowed to be executed.

In another example, if the script recommendation indicates disabling the data protection script, the backup server may prevent the script from being executed by notifying the application that the script cannot be executed, and monitoring the production environment to enforce the disablement of the data protection script.

In one or more embodiments, if the script recommendation indicates disabling the data protection script, the backup server may communicate with an authoritative entity(ies) to confirm the disablement of the data protection script prior to enforcing the disablement. The authoritative entities may be for example, multiple levels of security administrators of the production environment.

FIG. 2.2 shows a flowchart of a method of managing script execution in accordance with one or more embodiments of the invention. The method shown in FIG. 2.2 may be performed by, for example, a backup server (e.g., 110, FIG. 1). Other components of the system in FIG. 1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

Turning to FIG. 2.2, in step 220, the production environment is monitored to obtain script execution information associated with an application. In one or more embodiments, the production environment is monitored by monitoring the execution of data protection scripts performed before backups, after backups, before recovery, and after recovery of backups. The script execution information includes information about which applications initiate the data protection scripts, how many scripts are initiated and the corresponding timestamps, any impact of the data protection scripts on application data, which users generated and/or modified each data protection scripts, and/or any other information without departing from the invention.

In step 222, script metadata associated with the application is obtained. The script metadata includes organizing the script execution information based on each application initiating data protection scripts. The script metadata may include any relevant information obtained from the script execution information.

In step 224, the script metadata of the application is converted to an analytical format to obtain a security profile of the scripts executed by the application. In one or more embodiment, the analytical format is a format that includes the inputs used to process the script metadata by a script processing engine. The security profile may be a set of inputs corresponding to the application that specifies the script metadata in the analytical format.

In step 226, the security profile is applied to the script processing engine to obtain a script execution recommendation for scripts executed by the application. In one or more embodiments, the security profile is applied using a machine learning algorithm of the script processing engine to generate the script execution recommendation. The script execution recommendation may specify whether the application may continue to execute data protection scripts.

In step 228, the script execution recommendation is implemented. In one or more embodiments of the invention, the script execution recommendation is implemented based on whether the script execution recommendation indicates allowing or disabling execution of future data protection scripts by the application.

For example, if the script execution recommendation indicates allowing future data protection scripts to be executed, then the backup server may indicate such recommendation to the application by notifying the application of scripts being allowed to be executed.

In another example, if the script recommendation indicates disabling any data protection scripts, the backup server may prevent the script from being executed by notifying the application that scripts cannot be executed, and monitoring the production environment to enforce the disablement of the data protection scripts.

Figure 3:
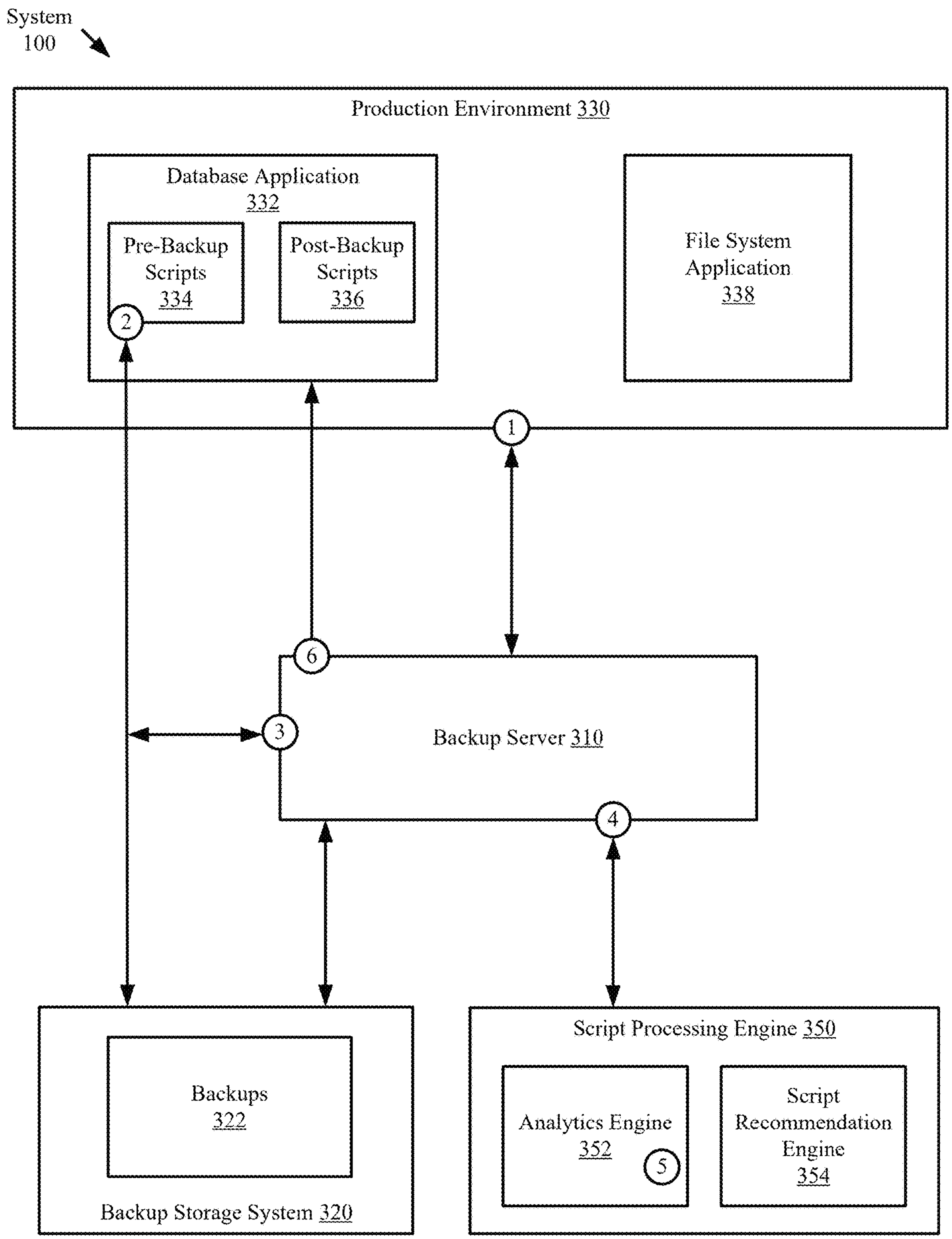
FIG. 3 shows an example in accordance with one or more embodiments of the invention.

To further clarify embodiments of the invention described throughout this disclosure, a non-limiting example is provided in FIG. 3. FIG. 3 shows a diagram of an example system. Circled numbers in FIG. 3 represent actions performed by components of the example system and described below using brackets (e.g., "[1]" below represents the circled "1" in FIG. 3).

Example

Turning to FIG. 3, consider a scenario in which a production environment includes a database application (332) and a file system application (334) that utilizes a backup storage system (320) for data protection workloads such as storing backups (322) and recovering application data from the backups (322). A backup server (310) of the example system performs application discovery to obtain relevant information about the database application (332) and the file system application (338) such as the vendor of the applications (332, 338), the types of applications (332, 338), the application version, and the users of each respective application (332, 338) [1].

After the application discovery is performed, the database application (332) may desire to execute pre-backup scripts (334) that specify deleting a specific large file of the database prior to backup to prevent overloading the backup workload. The pre-backup scripts (334) are initiated by sending a request to the backup server (310) for executing the pre-backup scripts (334) and post-backup scripts (336). The backup server (310) utilizes the obtained application information from the application discovery to generate a formatted document that specifies application information about the database application (332) initiating the request, and inputs the formatted document to a script recommendation engine (354) of a script processing engine (350), in accordance with FIG. 2.1, to obtain an output that specifies enabling execution of the pre-backup scripts (334).

Following the enablement of the pre-backup scripts (334), the database application (332) executes the pre-backup scripts (334) before generation of each of the backups (322) stored in the backup storage system (320) [2]. The backup server (310) monitors the execution of the pre-backup scripts (334) to obtain script metadata [3]. The script metadata specifies information such as the user that created the pre-backup scripts (334), the actions performed by execution of said scripts, an identifier of the scripts, a type of script, an operating system in which the scripts operate, the content of the scripts, a signature of the scripts, a checksum value of the scripts, and the application (332) executing the scripts. The script metadata is formatted into an analytics document and input into the analytics engine (352) of the script processing engine (350) [4]. The analytics engine (352) generates an output in accordance with FIG. 2.2 [5] and provides said output to the backup server. The output specifies a recommendation for continuing to allow the scripts to execute.

In such instances in which the output was a recommendation to halt execution of the pre-backup scripts (334) the backup server (310) may consult with an authoritative entity (not shown) of the example system to confirm the prevention of the execution is permissible. In this example, the authoritative entity is an administrator of a security department managing the security of the production environment (330) and any backups (322) generated from the executed applications (332, 338). The recommendation confirming allowing the execution of the pre-backup scripts (334) is provided to the database application (332) [6].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a system and method for securely and automatically managing the execution of data protection scripts performed in a production environment that manages valuable applications such as virtual machines and databases. With a production environment housing large numbers of applications and significantly large numbers of backups being generated periodically, the manual management of the execution of these scripts by administrative users may be difficult. Embodiments disclosed herein include performing evaluations of the data protections scripts to be performed relative to a backup or recovery operation to protect the data from inadvertently being misused (e.g., deleted) and unrecoverable as caused potentially by the execution of such scripts.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing data protection scripts, the method comprising:

obtaining, by a backup server, registration information associated with a set of applications operating on a production environment;

performing application discovery on the production environment using the registration information to obtain application information, wherein the application information comprises a type of each of the set of applications, a number of users operating on each of the set of applications, and a rate of data protection by each of the set of applications;

after performing the application discovery, obtaining a request for executing a data protection script by an application of the set of applications, wherein the data protection script is associated with a data protection workload, and wherein the data protection workload is one of: a backup of one of the set of applications and a recovery of the backup to the production environment, and wherein the data protection script specifies at least one action comprising one of a list consisting of: suspending virtual machine operation before the recovery reactivating the virtual machine operation after completion of the recovery, mounting a file system for the application data, unmounting the file system, pausing operation of a database in one of the set of applications, and obtaining transaction logs of the application data;

applying a portion of the application information corresponding to the application to a script processing engine to obtain a script recommendation, wherein the script recommendation indicates not allowing the data protection script from executing on the production environment;

implementing the script recommendation on the production environment, wherein implementing the script recommendation comprises enforcing the disablement of the data protection script from executing on the production environment;

obtaining a second request for executing a second data protection script by a second application of the set of applications;

applying a portion of the application information corresponding to the application to the script processing engine to obtain a second script recommendation, wherein applying the portion of the application information comprises converting the application information to a format readable to the script processing engine to obtain a formatted input, and applying the formatted input to a machine learning algorithm of the script processing engine to generate the second script recommendation, and wherein the second script recommendation indicates allowing the second data protection script to be executed in the production environment; and implementing the second script recommendation on the production environment, wherein implementing the second script recommendation comprises notifying the application that the data protection script is allowed.

2. The method of claim 1, wherein the data protection script is one of: a pre-backup script, a post-backup script, a pre-recovery script, and a post-recovery script.

3. The method of claim 1, wherein the registration information comprises:

information about the set of applications registered to the production environment, a date of registration, and information about an owner of each of the set of applications.

4. The method of claim 1, wherein applying the portion of the application information to the script processing engine comprises inputting the portion of the application information to a machine learning algorithm of the script processing engine, wherein the machine learning algorithm outputs the script recommendation.

5. A non-transitory computer readable medium comprising computer readable program code, which when executed by a computer processor enables the computer processor to perform a method for managing data protection scripts, the method comprising:

obtaining, by a backup server, registration information associated with a set of applications operating on a production environment;

performing application discovery on the production environment using the registration information to obtain application information, wherein the application information comprises a type of each of the set of applications, a number of users operating on each of the set of applications, and a rate of data protection by each of the set of applications;

after performing the application discovery, obtaining a request for executing a data protection script by an application of the set of applications, wherein the data protection script is associated with a data protection workload, and wherein the data protection workload is one of: a backup of one of the set of applications and a recovery of the backup to the production environment, and wherein the data protection script specifies at least one action comprising one of a list consisting of: suspending virtual machine operation before the recovery reactivating the virtual machine operation after completion of the recovery, mounting a file system for the application data, unmounting the file system, pausing operation of a database in one of the set of applications, and obtaining transaction logs of the application data;

applying a portion of the application information corresponding to the application to a script processing engine to obtain a script recommendation, wherein the script recommendation indicates not allowing the data protection script from executing on the production environment; and implementing the script recommendation on the production environment, wherein implementing the script recommendation comprises enforcing the disablement of the data protection script from executing on the production environment;

obtaining a second request for executing a second data protection script by a second application of the set of applications;

applying a portion of the application information corresponding to the application to the script processing engine to obtain a second script recommendation, wherein applying the portion of the application information comprises converting the application information to a format readable to the script processing engine to obtain a formatted input, and applying the formatted input to a machine learning algorithm of the script processing engine to generate the second script recommendation, and wherein the second script recommendation indicates allowing the second data protection script to be executed in the production environment; and implementing the second script recommendation on the production environment, wherein implementing the second script recommendation comprises notifying the application that the data protection script is allowed.

6. The non-transitory computer readable medium of claim 5, wherein the data protection script is one of: a pre-backup script, a post-backup script, a pre-recovery script, and a post-recovery script.

7. The non-transitory computer readable medium of claim 5, wherein the registration information comprises: information about the set of applications registered to the production environment, a date of registration, and information about an owner of each of the set of applications.

8. The non-transitory computer readable medium of claim 5, wherein applying the portion of the application information to the script processing engine comprises inputting the portion of the application information to a machine learning algorithm of the script processing engine, wherein the machine learning algorithm outputs the script recommendation.

9. A system, comprising:

a processor; and memory including instructions, which when executed by the processor, perform a method comprising:

obtaining, by a backup server, registration information associated with a set of applications operating on a production environment;

performing application discovery on the production environment using the registration information to obtain application information, wherein the application information comprises a type of each of the set of applications, a number of users operating on each of the set of applications, and a rate of data protection by each of the set of applications;

after performing the application discovery, obtaining a request for executing a data protection script by an application of the set of applications, wherein the data protection script is associated with a data protection workload, and wherein the data protection workload is one of: a backup of one of the set of applications and a recovery of the backup to the production environment, and wherein the data protection script specifies at least one action comprising one of a list consisting of: suspending virtual machine operation before the recovery, re-activating the virtual machine operation after completion of the recovery, mounting a file system for the application data, unmounting the file system, pausing operation of a database in one of the set of applications, and obtaining transaction logs of the application data;

applying a portion of the application information corresponding to the application to a script processing engine to obtain a script recommendation, wherein the script recommendation indicates not allowing the data protection script from executing on the production environment; and implementing the script recommendation on the production environment, wherein implementing the script recommendation comprises enforcing the disablement of the data protection script from executing on the production environment;

obtaining a second request for executing a second data protection script by a second application of the set of applications;

applying a portion of the application information corresponding to the application to the script processing engine to obtain a second script recommendation, wherein applying the portion of the application information comprises converting the application information to a format readable to the script processing engine to obtain a formatted input, and applying the formatted input to a machine learning algorithm of the script processing engine to generate the second script recommendation, and wherein the second script recommendation indicates allowing the second data protection script to be executed in the production environment; and implementing the second script recommendation on the production environment, wherein implementing the second script recommendation comprises notifying the application that the data protection script is allowed.

10. The system of claim 9, wherein the data protection script is one of: a pre-backup script, a post-backup script, a pre-recovery script, and a post-recovery script.

11. The system of claim 9, wherein the registration information comprises:

information about the set of applications registered to the production environment, a date of registration, and information about an owner of each of the set of applications.

12. The system of claim 9, wherein applying the portion of the application information to the script processing engine comprises inputting the portion of the application information to a machine learning algorithm of the script processing engine, wherein the machine learning algorithm outputs the script recommendation.

* * * * *